April 28, 1931.  L. D. SOUBIER  1,802,789
AUTOMATIC TEMPERATURE CONTROL FOR GLASS
Filed Feb. 16, 1927   2 Sheets-Sheet 1
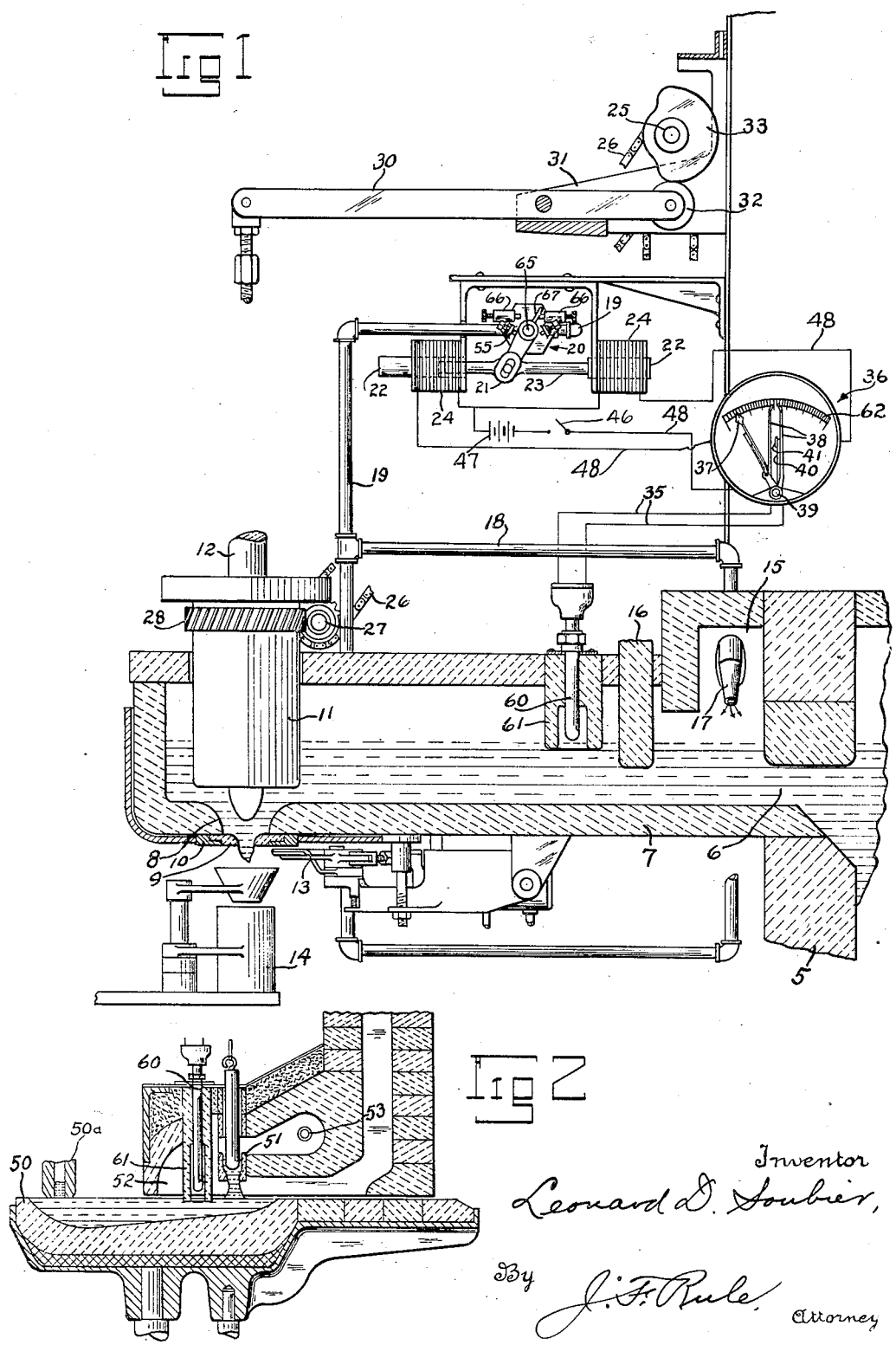

April 28, 1931.  L. D. SOUBIER  1,802,789
AUTOMATIC TEMPERATURE CONTROL FOR GLASS
Filed Feb. 16, 1927   2 Sheets-Sheet 2

Inventor
Leonard D. Soubier
By J. F. Rule
Attorney

Patented Apr. 28, 1931

1,802,789

REISSUED

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

AUTOMATIC TEMPERATURE CONTROL FOR GLASS

Application filed February 16, 1927. Serial No. 168,723.

The present invention relates to means for automatically regulating and controlling the temperature and viscosity of a body or supply of molten glass from which charges are periodically transferred to forming molds. The invention is equally adaptable for use in connection with gravity flow type feeders and upon tanks or pots from which charges are gathered by suction.

An object of the present invention is to provide means automatically operated by temperature changes in molten glass in a container to increase or decrease the effectiveness of glass heating means arranged to normally apply a flame of predetermined intensity to the glass. Thus, lowering of the glass temperature beyond a predetermined degree causes an increase in the effectiveness of the heating means, while an increase in the glass temperature to an abnormal degree will cause a decrease in the effectiveness of said heating means.

A further object of the invention is to provide novel means for varying the effectiveness of the glass heating burners, such means including a valve for increasing or decreasing the supply of fuel to the burners and automatic means operated solely by changes in the temperature of the glass flowing through the forehearth or glass working tank, to actuate said valve.

Other objects of the invention will be apparent hereinafter.

In the accompanying drawings:

Fig. 1 is a vertical longitudinal sectional view of glass feeding apparatus to which the present invention is applied, with parts shown in elevation, illustrating the means for actuating the fuel supply valve.

Fig. 2 is a sectional view showing my temperature control mechanism applied to an open glass working tank or pot from which charges are gathered by suction.

Figure 3:
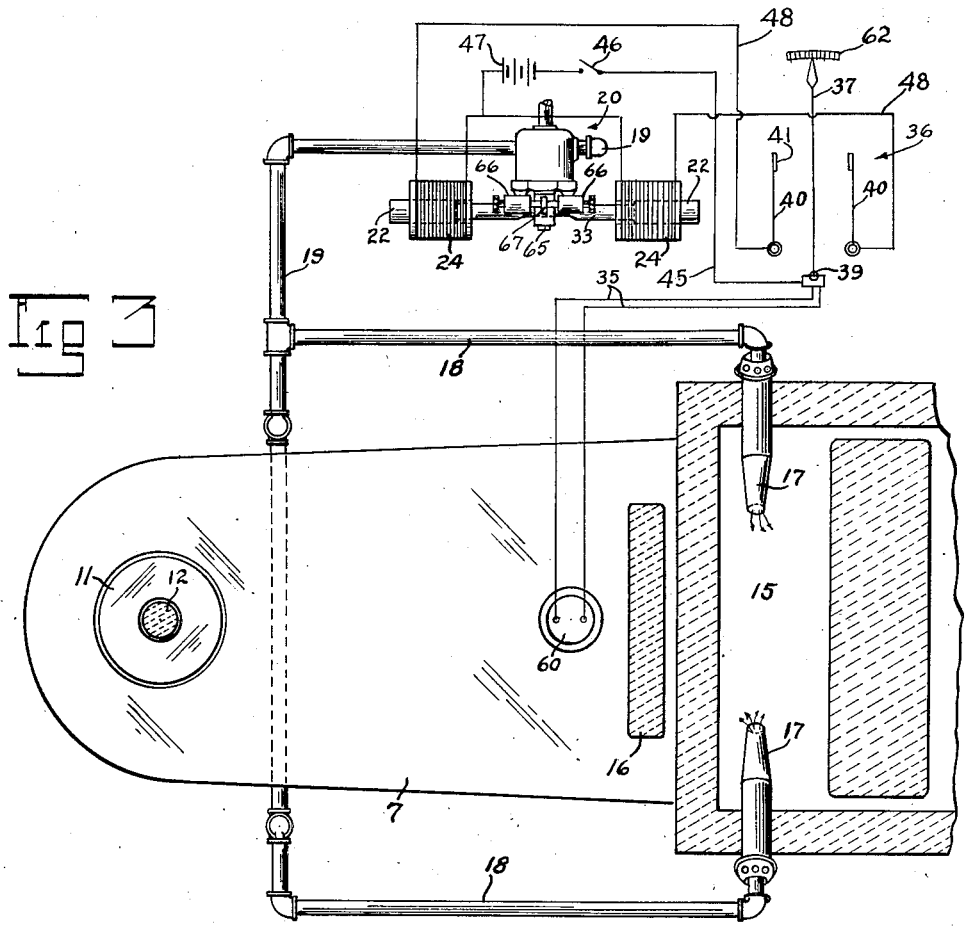
Fig. 3 is a plan view, partly in section, showing the relation between the forehearth and means for actuating the fuel supply valve, the electrical circuits being diagrammatically illustrated.

Referring to the accompanying drawings, the furnace wall 5 is provided with an opening 6 by way of which the laterally extending boot or forehearth 7 communicates with the interior of the furnace and is continuously supplied with fresh molten glass. Adjacent the nose of the boot, a bottom outlet opening 8 is formed. A clay bushing 9 is arranged at the lower end of the discharge opening 8 and is held in place by a supporting ring 10. Uniformity of temperature of the glass over and around the outlet opening 8 is maintained by a vertical sleeve or tube 11 which is continuously rotated through a cam shaft 25 having a sprocket chain connection 26 with a worm 27 running in mesh with a worm gear 28 on said tube (Fig. 1).

The flow of glass through the bottom outlet opening is periodically retarded by movement of a plunger 12 arranged within the rotating sleeve 11, said plunger being periodically actuated by a lever 30, fulcrumed near its inner end to a supporting bracket 31 and having at its inner end a cam roll 32 running on a continuously rotating cam 33 fixed to the cam shaft 25. Operation of the plunger is timed with the movements of a cut-off mechanism 13 so that charges of glass are periodically severed from the issuing stream and dropped by gravity into a shaping mold 14.

Adjacent the furnace wall, the cover of the forehearth is stepped up slightly providing a heating chamber 15 whose front end is closed off from the remainder of the boot by a vertically adjustable gate 16 which also serves as a skimmer. Heating devices, preferably in the form of gas burners 17, are arranged to heat the glass in the boot or forehearth and are connected by pipes 18 to a common fuel supply line 19 in which is arranged a fuel flow control valve 20.

The valve 20 is provided with an operating lever 21 having pin and slot connection with a rod 23 extending through horizontally aligned solenoids 24 and mounting suitable cores 22 which normally extend slightly into the outer ends of the windings of the solenoids. Movement of the lever 21 is limited by stops 55 arranged below the valve stem 65, said stops being adjustable to contact with the arm at predetermined points. Return of the valve control lever 21 to a pendent or normal operating position is caused by spring devices 66 bearing against opposite faces of a finger 67 extending upwardly from the lever 21. These devices may be adjustable to permit setting of the lever 21 at various normal operating positions.

The valve actuating solenoids operate independently of each other to swing the valve operating lever 21 in one direction or the other as glass temperature conditions require. For a full disclosure of the fuel flow control valve 20 and the specific operating means, reference may be had to my Patent Number 1,750,973, March 18, 1930.

According to the present invention, automatic control for the valve includes provision of any approved form of thermocouple 60 arranged within a protecting shell or tube 61 of refractory material, the lower end of the thermocouple being arranged in proximity to the surface of the glass in the boot. A pair of conductors 35 connect the thermocouple 60 with an indicating control pyrometer 36 of standard construction (Figs. 1 and 3). This pyrometer includes a graduated scale 62 along which the free end of a pointer 37 moves to indicate various temperatures. There is also provided a pair of contact carrying arms 38 fulcrumed to the pin 39 mounting the pointer 37 (Fig. 1). Each arm 38 is individually adjustable along the scale and mounts a short yieldable finger 40, one end of which is pivoted to said arm, while the other end is free and carries a flat contact head 41 adapted at times to be engaged by the body of the pointer 37. Each finger 40 is provided with means (not shown) to yieldably hold said finger at its innermost position. A conductor 45 extends from the inner end of the pointer 37 to the adjacent ends of the solenoids 24, the side of the circuit formed by this conductor, also including a switch 46 and a battery 47 (Figs. 1 and 3). The opposite ends of the solenoids 24 have direct connection with the contact carrying fingers 40 (Fig. 3) through conductors 48.

The thermo-couple 60 is located comparatively near the burner 17 so that it will respond to temperature changes in the glass a comparatively short time after the glass has passed beyond the burner. The thermocouple is also comparatively remote from the feeder outlet 8 so that there is a considerable volume of gas between the thermo-couple and the outlet, sufficient to provide a multiplicity of mold charges. The thermo-couple will thus respond to temperature changes in the glass that has passed the burner, much quicker than if said couple were located at or near the outlet.

In operation, the switch 46 is first opened so the fuel flow control valve 20 will not be automatically actuated while the operator is ascertaining the degree of temperature at which the glass is in the best condition for working. After experiments have shown the temperature at which the glass should be run, the arms 38 on the indicating control pyrometer are manually adjusted so that they are spaced equal distances from the opposite sides of the pointer 37, which, at this stage of operation, points to the degree at which the glass is flowing in its best condition. The arms 38 will be retained at any desired setting by frictional engagement with the pivot pin 39 on which they are mounted.

A drop in the temperature of the glass in the boot below the normal degree will affect the thermocouple 60, which, in turn, causes movement of the pointer 37 along the scale of the indicating pyrometer. A sufficient drop in the glass temperature causes movement of the pointer 37 to the left (Fig. 1) so that it engages with the contact 41 on the yieldable finger 40, closing the circuit through the solenoid 24 at the left of the fuel flow control valve 20 causing additional opening of the valve to increase the supply of fuel to the burner 17.

Energization of one of the solenoids 24 and consequent change in the degree to which the valve 20 is opened, will continue so long as the pointer 37 is positioned a predetermined number of degrees away from the normal operation temperature. Upon return of the pointer beyond a given degree, the circuit will be broken and the valve permitted to resume its normal operating position. Due to the yieldability of the contact carrying fingers 40, the pointer 37 is permitted to accurately indicate the exact temperature in the container, even beyond the point at which contact with said finger 40 was affected. Thus, the actual temperature drop may be readily ascertained. An increase in the temperature above the normal point, causes movement of the pointer 37 to the right, closing the circuit in which the other solenoid is arranged. This solenoid operates to close the valve beyond the normal operating station and thereby reduces the flow of the fuel to the burner.

In Fig. 2, I have shown the application of a thermo-couple 60 to use in connection with a glass working tank 50 from which charges of glass are periodically gathered by suction into molds 50ª. In this form, the thermocouple is protected by a shell or tube 61 of refractory material and is intended to actuate an indicating control pyrometer as previously set forth. This tube prevents heat other than that radiated upwardly from the glass, from affecting the thermocouple. Thus, accurate measuring of the glass temperature is possible. In this form, the molten glass is delivered to the tank 50 by way of a trough 51. A combustion chamber 52 is located directly above the surface of the glass and receives its supply of fuel through an injector 53 from any suitable source.

Figure 4:
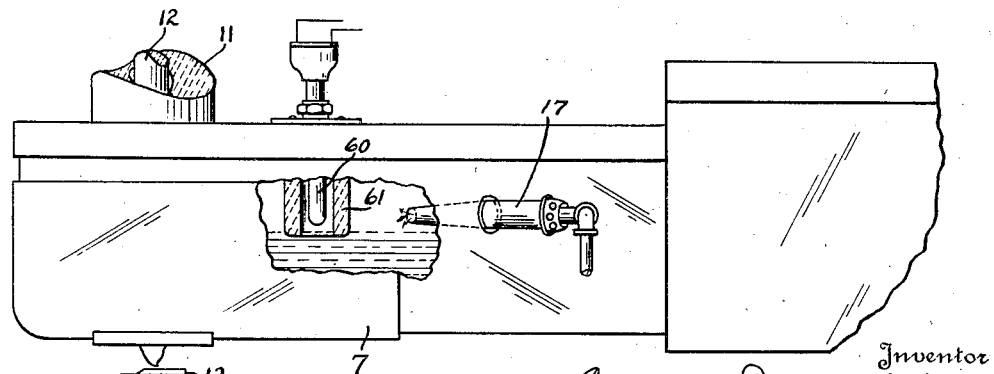
Fig. 4 is a side elevation, parts being broken away in section, showing a modification in the arrangement of the pyrometer boot heating device.

In another adaptation of my invention to a flow type feeder, as shown in Fig. 4, a thermocouple 60 is arranged in proximity to the discharge orifice and regulating plunger 12 so that the temperature of the glass at the latest possible moment prior to issuance from the feeder is indicated on the pyrometer, and through this apparatus causes desired variance in the effectiveness of the burner 17. In this form, as well as in the form first set forth, the thermocouple is located between the heating device and the point at which charges are transferred to the forming molds so that temperature of the glass after its final treatment by the burners 17 will be indicated on the control pyrometer. Thus, it is seen that if the temperature of the glass is brought up to the proper degree by action of the burners 17, the valve 20 will not be operated. If the thermocouple 60 were located between the burner 17 and the furnace outlet 6, the relatively low temperature of the glass would cause opening of the valve and flow of an unnecessarily large amount of fuel to the burner 17 so that by the time the glass reached the discharge orifice, it would be in an excessively fluent condition and difficult to control.

Manifestly, certain minor changes may be resorted to within the spirit and scope of the appended claims.

What I claim is:

1. In combination, a container for molten glass, means for supplying molten glass thereto, said container having a discharge outlet to which the glass flows continuously from the point at which it is supplied to the container, a heating device arranged to apply heat to said flowing glass in the container, a valve adapted to control the flow of fuel to the heating device, and automatic valve actuating means, including a thermocouple located in proximity to the surface of the glass in the container at a point remote from the discharge outlet but intermediate said outlet and the point at which said heat is applied to the glass.

2. In combination, a container for molten glass, means for supplying molten glass thereto, said container having a discharge outlet to which the glass flows continuously from the point at which it is supplied to the container, means to heat the said flowing glass, a valve operable to vary the effectiveness of the glass heating means, a temperature indicating device, means located within the influence of the heat of the glass at a point remote from the discharge outlet but intermediate said outlet and the point at which said heat is applied to the glass and connected to said indicating device for causing operation of the latter, electrical devices operable at times by the temperature indicating device to operate the valve, and means permitting adjustment of the temperature indicating device to cause operation of the valve at predetermined degrees of temperature.

3. In combination, a container for molten glass, means for supplying molten glass thereto, said container having a discharge outlet to which the glass flows continuously from the point at which it is supplied to the container, means to heat the said flowing glass, a valve operable to vary the effectiveness of the glass heating means, a temperature indicating device, means located within the influence of the heat of the glass at a point remote from the discharge outlet but intermediate said outlet and the point at which said heat is applied to the glass and connected to said indicating device to cause operation of the latter, a pair of solenoids, operating connections between the solenoids and valve whereby the solenoids are operable to increase or decrease the flow of fuel through the valve, and means whereby a predetermined degree of movement of the temperature indicating device energizes one of the solenoids, causing operation of the valve.

4. In combination, a container for molten glass, means for supplying molten glass thereto, said container having a discharge outlet to which the glass flows continuously from the point at which it is supplied to the container, means to heat the said flowing glass, a valve operable to vary the effectiveness of the glass heating means, a temperature indicating device, means located within the influence of the heat of the glass at a point a considerable distance from the discharge outlet but intermediate said outlet and the point at which said heat is applied to the glass and connected to said indicating device for causing operation of the latter, a pair of solenoids, operating connections between the solenoids and valve whereby the solenoids are operable to increase or decrease the flow of fuel through the valve, means whereby a predetermined degree of movement of the temperature indicating device energizes one of the solenoids, causing operation of the valve, and means permitting adjustment of the temperature indicating device to cause operation of the valve at any desired degree.

5. The combination with means for supplying molten glass, of a container into and through which the glass flows, said container provided with an outlet through which the glass issues, a burner positioned and arranged to supply heat to the glass at a point within said container, a thermocouple controlled by the heat of the glass at a point intermediate said heating point and said outlet and nearer to the heating point than to the outlet, and mechanism controlled by said thermocouple for regulating and controlling the supply of fuel to the burner.

6. The combination with means for supplying molten glass, of a container into and through which the glass flows, said container provided with an outlet through which the glass issues, a burner positioned and arranged to supply heat to the glass at a point within said container, a thermocouple controlled by the heat of the glass at a point intermediate said heating point and said outlet and nearer to the heating point than to the outlet, a pyrometer actuated and controlled by said thermocouple, a valve controlling the supply of fuel to the burner, and electroresponsive mechanism controlled by the pyrometer for actuating said valve.

7. The combination of a glass furnace having a boot or extension into which molten glass flows from the furnace, said extension having an outlet through which the molten glass issues, means for periodically severing the glass into mold charges, a gas burner arranged to supply heat to the glass flowing through said extension, a thermocouple located intermediate said burner and said outlet in position to be controlled by the heat of the flowing glass and sufficiently remote from the outlet to provide space between the thermo-couple and outlet for a volume of glass sufficient for a multiplicity of mold charges, a pyrometer actuated by said thermocouple, a valve controlling the supply of fuel gas to the burner, electromagnets for actuating said valve, and means actuated by the pyrometer for controlling the circuits of the electromagnets.

8. In combination, a glass furnace having a lateral extension into one end of which molten glass flows from the furnace, said extension having a bottom outlet orifice adjacent its other end, a gas burner arranged to apply heat to the glass immediately upon entry into said extension, a thermo-couple located intermediate said burner and bottom outlet orifice and nearer the burner than to the orifice, a wall projecting into the glass in said extension and formed to prevent direct application of heat to said thermo-couple by the gas burner, a pyrometer actuated and controlled by said thermo-couple, and means controlled by the pyrometer to regulate and control the supply of fuel to the gas burner.

Signed at Toledo, in the county of Lucas and State of Ohio, this 14th day of February, 1927.

LEONARD D. SOUBIER.